Oct. 10, 1950 E. C. WARRICK ET AL 2,525,191
OIL DILUTION AND BY-PASS CONTROL SYSTEM
Filed Jan. 10, 1944 2 Sheets-Sheet 1
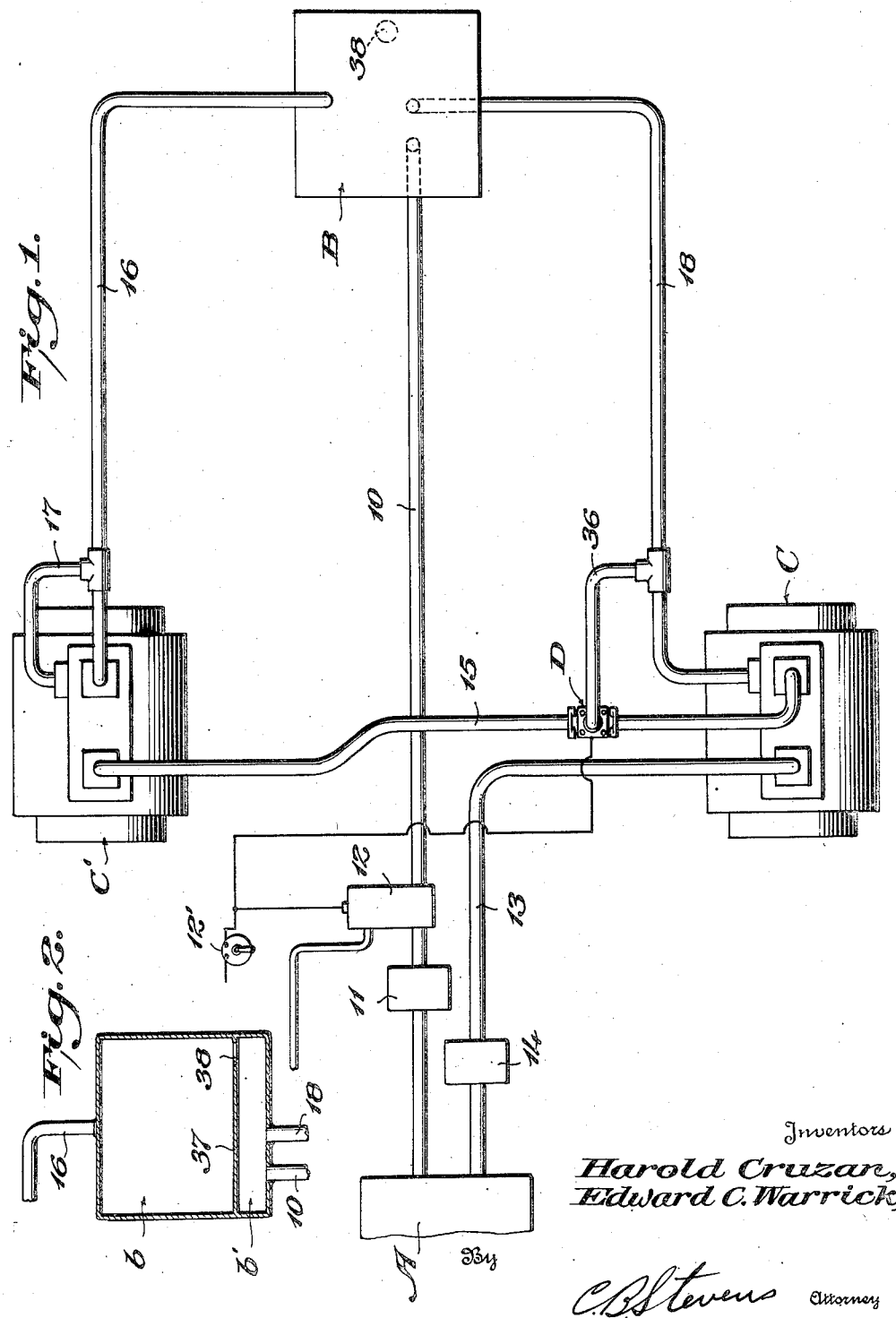
Inventors
Harold Cruzan,
Edward C. Warrick,
By
C. B. Stevens Attorney

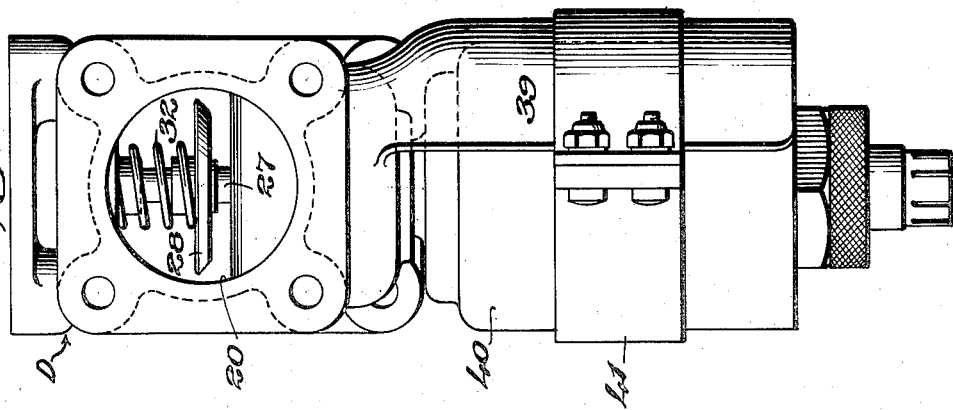

Patented Oct. 10, 1950

2,525,191

UNITED STATES PATENT OFFICE 2,525,191

OIL DILUTION AND BY-PASS CONTROL SYSTEM

Edward C. Warrick, Cincinnati, Ohio, and Harold Cruzan, Los Angeles, Calif., assignors to United Aircraft Products, Inc., Dayton, Ohio, a corporation of Ohio Application January 10, 1944, Serial No. 517,722

3 Claims. (Cl. 123—196)

This invention relates to fluid circulating systems and to valves for use in such systems, and has particular reference, on the one hand, to improvements in fluid circulating systems of the closed-circuit type including a tank or reservoir from which the fluid is delivered and to which it is returned during normal operation of the system and, on the other hand, to improvements in by-pass valves for use in such systems or other systems to direct flow of the fluid from one conduit to either of a pair of other conduits.

One example of a closed-circuit fluid circulating system of the type with which the invention particularly is concerned is the lubricant circulating system of an internal combustion engine employed for powering an aircraft. In such a system it is usual to employ a tank or reservoir from the bottom of which the lubricant is delivered to the engine and to the top of which the lubricant is returned from the engine so that the entire volume of the lubricant normally is circulated through the system. At times, however, the lubricant may become cold and congealed as, for example, during a period of idleness of the engine either during flight of the aircraft or when the aircraft is at rest upon the ground, and when such a condition exists it may be desirable to introduce into the lubricant a suitable diluent in order to enable the engine readily to be started. It is undesirable, however, to dilute any more of the total volume of the lubricant than is absolutely necessary.

Accordingly, one special and important object of the invention is to provide a system of the type mentioned including means for introducing a diluent or equivalent medium into the lubricant or equivalent fluid in the system, and further including simple, practical means whereby only a portion of the total volume of the lubricant or other fluid in the system has the diluent or equivalent medium supplied thereto and whereby this portion of the lubricant or other fluid is circulated through the system in by-passing relationship to the remaining portion thereof so that the latter is unaffected by the diluent or equivalent medium.

With the foregoing and other objects in view, which will become more fully apparent as the nature of the invention is better understood, the same consists in a fluid circulating system and in a by-pass valve for use therein, both embodying the novel combination and arrangement of parts as will be hereinafter more fully described, illustrated in the accompanying drawings and defined in the appended claims.

In the accompanying drawings, wherein like characters of reference denote corresponding parts in the different views:

Fig. 1 is a diagrammatic view of a fluid circulating system embodying the novel features of the invention.

Fig. 2 is a vertical section through the tank or reservoir shown in Fig. 1.

Fig. 3 is a central, vertical longitudinal section through the by-pass valve shown in Fig. 1; and Figs. 4 and 5 are side elevations of the by-pass valve.

Referring to the drawings in detail, first with particular reference to Fig. 1, A designates a portion of an internal combustion engine such as an aircraft engine, B designates a tank or reservoir to contain a lubricant for use in the engine A, and C, C' designate a pair of heat exchange units for cooling the lubricant.

In accordance with the invention a pipe 10 for the delivery of lubricant from the tank B to the engine A extends from the bottom of said tank to the engine and has interposed therein a suitable pump 11 for forcing the lubricant under pressure to the engine parts. Also interposed in the pipe 10 is a valve 12 of any suitable type through which a suitable diluent, such as gasoline, may be introduced into said pipe. Normally this valve is biased to a closed position preventing the diluent from entering the pipe 10 and preferably it includes suitable electrical operating means, such as a solenoid, whereby it may be opened by remote control to admit the diluent to said pipe 10. As indicated the solenoid is in an electrical circuit and may be energized by automatic or manual means operative to close a switch 12'.

From the engine A a lubricant return pipe 13 leads to the inlet of the cooling unit C and has interposed therein a suitable scavenging pump 14 for effecting return flow of the lubricant from the engine to said cooling unit.

The cooling units C, C' are of a known type including means to cause the lubricant, when it is hot, to flow through their heat exchange portions and to thereby be cooled, and to cause the lubricant, when it is cold and more or less congealed, to by-pass said heat exchange portions. No novelty in respect to said cooling units per se is claimed and therefore they are not illustrated in detail. Suffice it is to say that each cooling unit has one inlet and two outlets for the lubricant and that one of said outlets is from the heat exchange portion of the unit while the other is from the by-pass passageway thereof.

Connecting the outlet from the heat exchange portion of the cooling unit C with the inlet of the cooling unit C' is a pipe 15, while connecting the outlet from the heat exchange portion of the cooling unit C' with the top of the tank B is a pipe 16 with which is connected a pipe 17 which leads from the outlet of the by-pass passageway of said cooling unit C'. On the other hand, a pipe 18 connects the outlet from the by-pass passageway of the cooling unit C with the bottom of the tank B.

In the pipe 15 is interposed the by-pass valve shown in detail in Figs. 3 to 5 and designated generally as D. This valve comprises a casing 19 having an inlet opening 20 in one side thereof, one outlet opening 21 in the other side thereof, and a second outlet opening 22 in the top thereof. Moreover, within said casing 19 are lower and upper partition walls 23 and 24, respectively, the former or lower of which separates the inlet opening 20 from the outlet opening 21 and has therein a port 25 affording communication between said openings 20, 21, and the latter or upper of which separates said inlet opening 20 from the outlet opening 22 and has therein a port 26 affording communication between said openings 20, 22.

The ports 25, 26 are axially alined with each other and have axially alined therewith a valve stem 27 which is slidably mounted in the lower portion of the casing 19 for longitudinal movement and which extends upwardly through the port 25 into the space between the partition walls 23, 24. On said valve stem, between the partition walls 23, 24 are lower and upper valves 28 and 29, respectively, of the disk or poppet type, the former of which controls flow of lubricant through the port 25 and the latter of which controls flow of the lubricant through the port 26.

The valves 28, 29 are slidable longitudinally along the valve stem 27 and on said valve stem are suitable lower and upper stops 30 and 31, respectively, the former of which limits downward movement of the lower valve 28 relative to said stem and the latter of which limits upward movement of the upper valve 29 relative to said stem. Moreover, an expansion coil spring 32 surrounds the valve stem 27 between the valves 28, 29 and tends constantly to move said valves downwardly and upwardly, respectively, along said stem against their respective stops 30 and 31. Furthermore, the spaced apart relationship of the stops 30, 31 is such that when the valves 28, 29 are engaged with said stops and either of said valves is closed with respect to its related port, the other of said valves is open with respect to the other port.

Suitable means such, for example, as an expansion coil spring 33 surrounding the valve stem 27 between a fixed part of the casing 19 and a suitable stop 34 on said stem, tends constantly to move said stem upwardly to a position in which the lower valve 28 is in open relationship to the port 25 and the upper valve 29 is in closing relationship to the port 26. On the other hand, suitable means, preferably electrical, is provided for moving the valve stem 27 downwardly to close the valve 28 and open the valve 29, this means comprising for example, a solenoid the winding 34a of which is suitably mounted in fixed relationship to the valve casing 19 and the core 35 on which is carried by the valve stem.

The part of the pipe 15 between the cooling unit C and the valve D is connected with the inlet opening 20 of said valve, and the part of said pipe 15 between the cooling unit C' and said valve is connected with the outlet opening 21 of said valve. On the other hand, the outlet opening 22 of said valve D is connected to the pipe 18 by a pipe 36.

The solenoids of the valve 12 and the by-pass valve D preferably are in the same electrical circuit whereby they are simultaneously energized and deenergized, and normally said solenoids are deenergized so that the valve 12 is closed and the valves 28 and 29 of the by-pass valve D are open and closed, respectively. Thus, when the lubricant is hot or warm, its path of flow is from the tank B through the pipe 10 to the engine A, from the engine through the pipe 13 to the cooling unit C, through the heat exchange portion of said cooling unit to the inlet opening 20 of the valve D via the portion of the pipe 15 which is between said cooling unit and said valve D, through the port 25 and the outlet opening 21 of said valve D to the inlet of the cooling unit C' via the portion of the pipe 15 which is between said valve D and said cooling unit C', and through the heat exchange portion of said cooling unit C' to and through the pipe 16 to the top of the tank B.

Should the lubricant for any reason become so cold and congealed as to render starting of the engine A difficult, the circuit including the solenoids of the valves 12 and D may be closed and thereby the valve 12 will be opened to admit diluent to the pipe 10 and, at the same time, the stem of the by-pass valve D will be moved downwardly to cause the valve 28 to close the port 25 and the valve 29 to open the port 26. The path of flow of the diluted lubricant then will be from the valve 12 through the pipe 10 to the engine, from the engine through the pipe 13 to the cooling unit C, and from said cooling unit directly to the bottom of the tank B either through the by-pass passageway of said cooling unit and the pipe 18, or through the heat exchange portion of said cooling unit and said pipe 18 via the pipe 15, the inlet opening 20 of the valve D, the port 26 and the outlet opening 22 of said valve D, and the pipe 36 which connects said outlet opening 22 with the pipe 18.

Whether the diluted lubricant will flow through the by-pass passageway or through the heat exchange portion of the cooling unit C depends upon whether the lubricant in the heat exchange portion of said cooling unit C is so cold and congealed as to obstruct flow through said portion of said unit. In any event, when the valve 28 of the by-pass valve D is closed, the diluted lubricant is prevented from flowing to the top of the tank B and is required to flow to the bottom of said tank from where it flows to the engine via the pipe 10 in by-passing relationship to the main body of the liquid in the upper part of said tank. Manifestly, therefore, when the diluent is supplied to the lubricant, only a part of the entire body of the lubricant is diluted and this diluted part is circulated in by-passing relationship to the remainder of the lubricant so that the latter is unaffected.

Ordinarily only enough of the diluent is supplied to the lubricant to sufficiently dilute the lubricant in the engine to enable the engine to be started. Thereupon the solenoids of the valves 12 and D are deenergized and said valves return to their normal positions so that the lubricant resumes its normal path of flow through the system as soon as it has become sufficiently heated to reestablish flow through the heat exchange portions of the cooling units by de-congealing the lubricant in said heat exchange portions in case congealment may have occurred therein.

To assist in insuring flow of the diluted portion of the lubricant in by-passing relationship to the main body of the lubricant in the tank B, a baffle plate 37 may be provided in said tank adjacent to the bottom thereof to divide the same into a large upper compartment b and a small lower compartment b', which compartments may be in communication with each other through an opening or openings 38 in said baffle plate so located with respect to the pipes 10 and 18 as practically to insure flow between said pipes only through the small lower compartment b' when lubricant is not being delivered to the upper compartment b through the pipe 16.

While two serially connected cooling units are shown in the system illustrated in Fig. 1, it is obvious that the system may, if desired, include one or more additional cooling units connected in series with the two units shown or may include only a single cooling unit such as the unit C, in which event the pipe 15 would, of course, lead from the valve D directly to the top of the tank B. In fact, so far as concerns the means including primarily the valve D for causing the diluted portion of the lubricant to by-pass the main body of the lubricant in the tank B, it is not essential that the system include any cooling unit at all. On the contrary, a pipe such as the pipe 13 may lead directly to the inlet opening 20 of the valve D, and from the outlet openings 21 and 22 of said valve other pipes may lead directly to the top and the bottom, respectively, of the tank B. The operation of the system then will remain identically as heretofore described insofar as concerns supplying of the diluent to the lubricant and diverting return flow of the lubricant from the top to the bottom of the tank B.

The diluent employed preferably is gasoline or of the highly volatile nature of gasoline so that it soon is evaporated from the lubricant by the heat of the engine after the latter has been started and the valve 12 has been closed.

While any suitable means may be provided for mounting the solenoid winding 34a in fixed and proper relationship to the casing 19 of the by-pass valve D, one simple and practical means for this purpose may comprise a skirt 39 of semi-circular shape in cross section either integral with or fixed to the casing 19 and depending therefrom to receive and embrace a casing 40 which houses the winding 34a, and a band 41 to clamp said casing 40 in said skirt. Moreover, while the solenoid core 35 may be either integral with or separate from the valve stem 27, it preferably is separate from said stem and has a quick-detachable connection therewith afforded, for example, by a head 42 on the lower end of the valve stem accommodated between the top of the core 35 and overlying flanges 43 extending inwardly from spaced side walls 44 projecting upwardly from the top of said core.

Without further description it is thought that the various novel features of the invention and its advantages will be readily understood. It is desired to point out, however, that while only a single specific embodiment of the invention has been illustrated and described, the same is readily capable of embodiment in specifically different mechanical structures within its spirit and scope as defined in the appended claims.

We claim:

1. A closed circuit lubricant circulating system comprising a tank for the lubricant, an engine, a delivery conduit leading from a bottom portion of said tank to said engine, a normally closed valve in said delivery conduit for introducing into said conduit a diluent for the lubricant, a return conduit leading from the engine to said tank, and including first and second branches leading respectively to the top portion of the tank and to the bottom portion thereof, an oil cooler in said return conduit, said oil cooler having main and by-pass outlets from which said first and second branches of said return conduit respectively extend, a diverter valve in said first branch operable to direct flow from said first branch to said second branch, and actuating means effecting simultaneously the opening of said normally closed valve and the operation of said diverter valve.

2. A closed circuit lubricant circulating system comprising a tank for the lubricant, an engine, a delivery conduit leading from a bottom portion of said tank to said engine, a normally closed valve in said delivery conduit for introducing into said conduit a diluent for the lubricant, conduit means extending from the engine including a first return conduit for conducting lubricant from the engine to a top portion of said tank and a second return conduit for conducting lubricant from the engine to a bottom portion of said tank, means compelling the lubricant normally to return to said tank by way of said first return conduit and to permit the return of lubricant to said tank by way of said second return conduit when the temperature of the lubricant is reduced below a predetermined value, a diverter valve in said first return conduit operable to direct flow from said first return conduit to said second return conduit, and means effecting operation of said diverter valve as a concomitant of the opening of said normally closed diluent control valve.

3. A closed circuit lubricant circulating system comprising a tank for the lubricant, an engine, a delivery conduit leading from a bottom portion of said tank to said engine, a normally closed valve in said delivery conduit for introducing into said conduit a diluent for the lubricant, conduit means extending from the engine including a first return conduit for conducting lubricant from the engine to a top portion of said tank and a second return conduit for conducting lubricant from the engine to a bottom portion of said tank, means for directing the lubricant alternatively through said return conduits in accordance with its temperature and viscosity conditions, a diverter valve in said first return conduit operable to compel the lubricant to return to said tank by way of said second return conduit, and means for effecting concomitantly the actuating of said diverter valve and the opening of said normally closed diluent control valve.

EDWARD C. WARRICK.
HAROLD CRUZAN.

REFERENCES CITED

The following references are of record in the file of this patent:

UNITED STATES PATENTS

| Number | Name | Date |
|---|---|---|
| 1,193,036 | McElroy | Aug. 1, 1916 |
| 1,860,731 | Cole | May 31, 1932 |
| 2,107,188 | Ryder | Feb. 1, 1938 |
| 2,188,801 | Worth | Jan. 30, 1940 |
| 2,311,069 | Miller | Feb. 16, 1943 |
| 2,331,378 | Dykeman | Oct. 12, 1943 |
| 2,345,606 | Jones | Apr. 4, 1944 |

FOREIGN PATENTS

| Number | Country | Date |
|---|---|---|
| 330,053 | Great Britain | June 5, 1930 |